(12) United States Patent
Ryu

(10) Patent No.: US 12,038,047 B2
(45) Date of Patent: Jul. 16, 2024

(54) HYBRID FLUID FILM BEARING

(71) Applicant: INDUSTRY-UNIVERSITY COOPERATION FOUNDATION HANYANG UNIVERSITY ERICA CAMPUS, Gyeonggi-do (KR)

(72) Inventor: Keun Ryu, Seoul (KR)

(73) Assignee: INDUSTRY-UNIVERSITY COOPERATION FOUNDATION HANYANG UNIVERSITY ERICA CAMPUS, Ansan-si (KR)

( * ) Notice: Subject to any disclaimer, the term of this patent is extended or adjusted under 35 U.S.C. 154(b) by 185 days.

(21) Appl. No.: 17/745,979

(22) Filed: May 17, 2022

(65) Prior Publication Data

US 2022/0275833 A1    Sep. 1, 2022

Related U.S. Application Data

(63) Continuation of application No. PCT/KR2020/016172, filed on Nov. 17, 2020.

(30) Foreign Application Priority Data

Nov. 18, 2019  (KR) .......................... 10-2019-0148003
Nov. 17, 2020  (KR) .......................... 10-2020-0153367

(51) Int. Cl.
*F16C 32/06*  (2006.01)
*F16C 17/02*  (2006.01)

(52) U.S. Cl.
CPC ........ *F16C 32/0659* (2013.01); *F16C 17/024* (2013.01); *F16C 32/0622* (2013.01)

(58) Field of Classification Search
CPC ...... F16C 17/024; F16C 27/02; F16C 27/045; F16C 32/06; F16C 32/0607;
(Continued)

(56) References Cited

U.S. PATENT DOCUMENTS 3,893,733 A  *  7/1975  Silver ................... F16C 17/042
                                                        384/106
6,155,720 A      12/2000  Bättig
(Continued)

FOREIGN PATENT DOCUMENTS

DE    3921704 A  *  1/1991  ............ F16C 17/024
JP    11-2240 A      1/1999
(Continued)

OTHER PUBLICATIONS

Machine Translation of KR-20090075272-A (Year: 2009).*
(Continued)

*Primary Examiner* — Alan B Waits
(74) *Attorney, Agent, or Firm* — Sughrue Mion, PLLC

(57) ABSTRACT

Provided is a hybrid fluid film bearing. The hybrid fluid film bearing comprises: a bearing housing installed on an outer diameter surface of a rotary shaft in the form of being coupled via a ring; a sleeve ring installed between the rotary shaft and the bearing housing, having gaps respectively with the rotary shaft and the bearing housing, and having a side in the circumferential direction opened in the radial direction; and a fixing pin connected between the bearing housing and the sleeve ring, and supported by the bearing housing so as to restrict rotation of the sleeve ring when the rotary shaft rotates. Also, the hybrid fluid film bearing may further comprise a compliant spring damper which is provided in the gap between the bearing housing and the sleeve ring and is provided as one or more bump foils.

7 Claims, 14 Drawing Sheets

(58) Field of Classification Search
CPC .............. F16C 32/0614; F16C 32/0622; F16C 32/0629; F16C 32/0659; F16C 32/0662; F16C 32/067; F16C 32/0674; F16C 32/0677; F16C 32/0685; F16C 32/0688
See application file for complete search history.

(56) References Cited

U.S. PATENT DOCUMENTS

| | | | |
|---|---|---|---|
| 8,944,688 B2 * | 2/2015 | Omori | F16C 32/06 384/106 |
| 2011/0033142 A1 | 2/2011 | Kim et al. | |
| 2017/0051788 A1 | 2/2017 | Kim | |

FOREIGN PATENT DOCUMENTS

| | | | |
|---|---|---|---|
| JP | 2004-239388 A | | 8/2004 |
| JP | 2013-108557 A | | 6/2013 |
| KR | 10-0413060 B1 | | 12/2003 |
| KR | 20090075272 A | * | 7/2009 |
| KR | 10-0938919 B1 | | 1/2010 |
| KR | 10-2010-0095237 A | | 8/2010 |
| KR | 10-2018-0084634 A | | 7/2018 |

OTHER PUBLICATIONS

Machine Translation of DE-3921704-A (Year: 1991).*
International Search Report for PCT/KR2020/016172 dated Feb. 22, 2021.
Office Action dated May 25, 2022 from the Korean Intellectual Property Office in KR Application No. 10- 2020-0153367.

* cited by examiner

[Fig. 1]
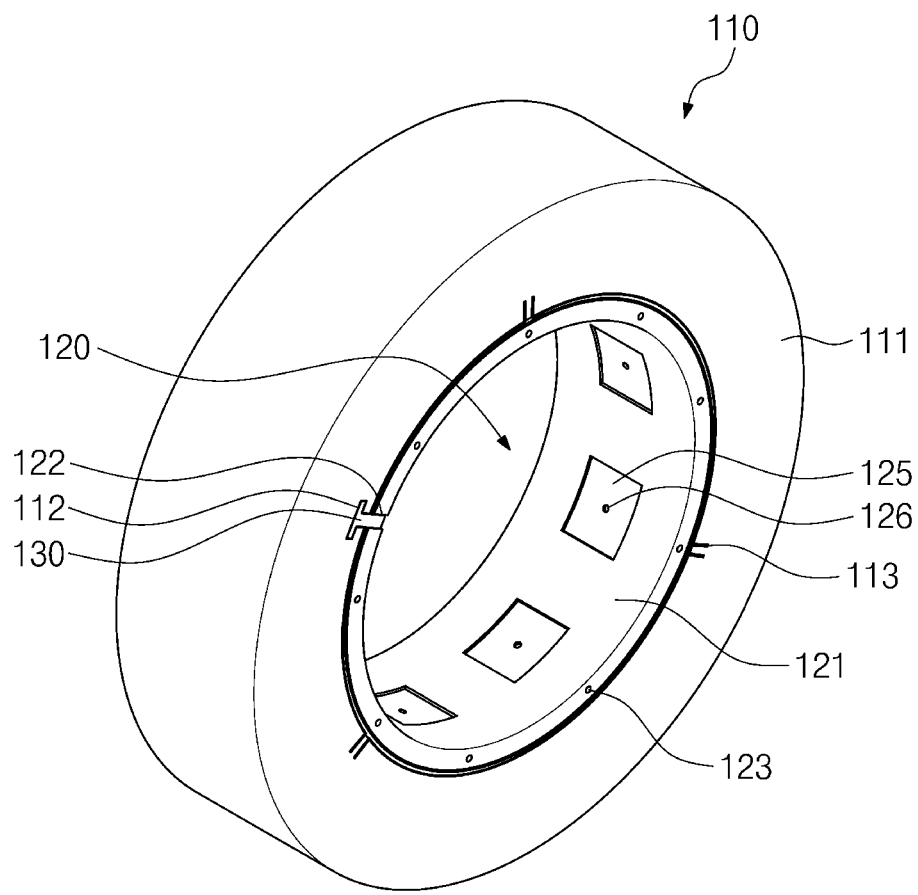

[Fig. 2]
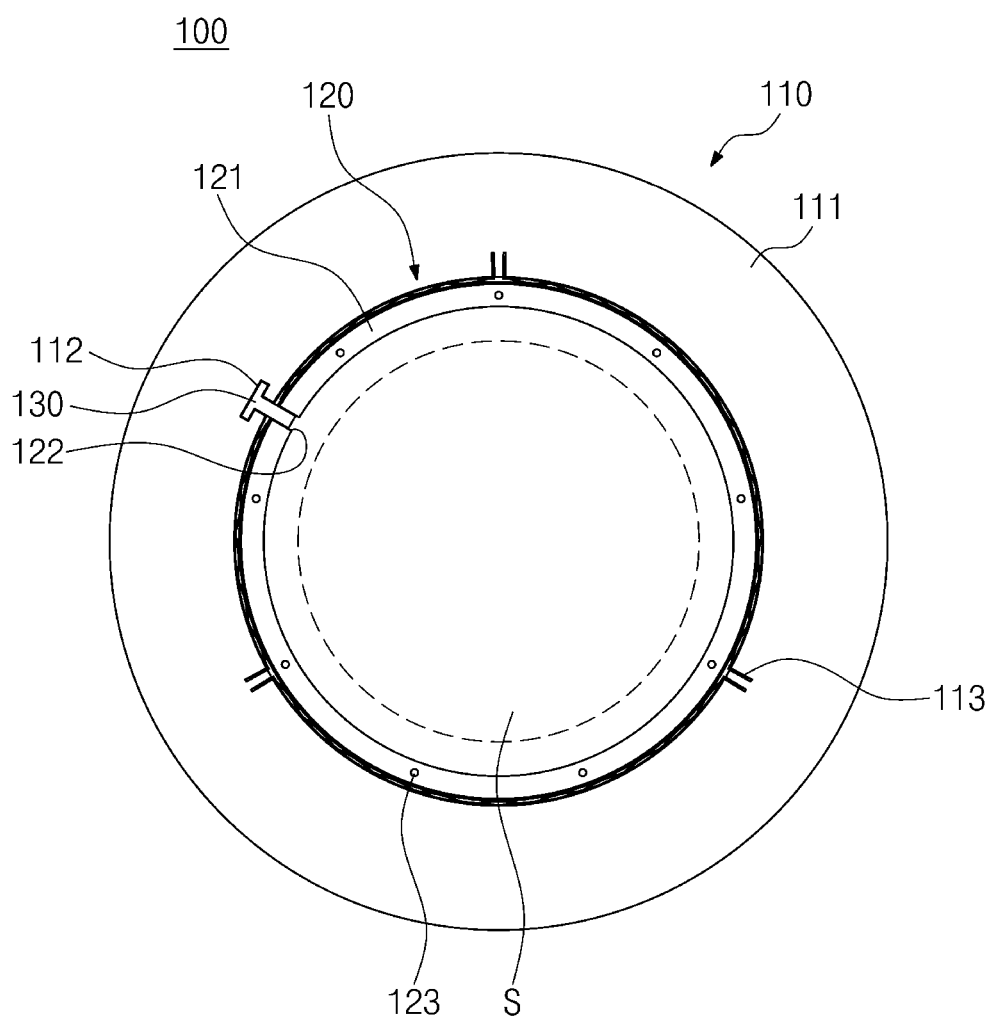

[Fig. 3]
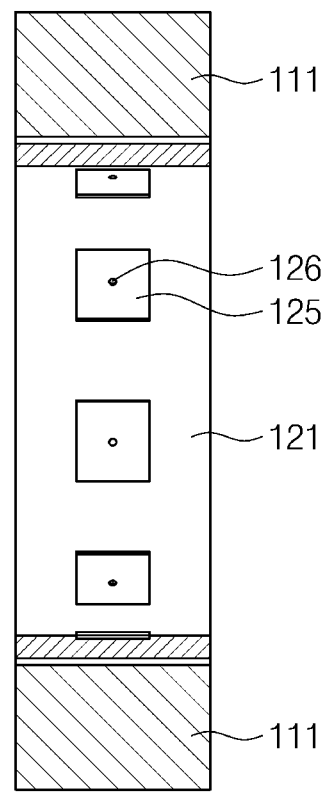
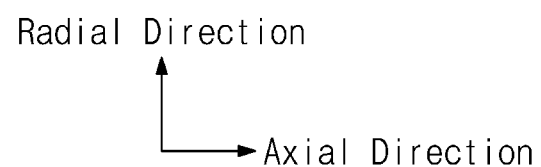

[Fig. 4]
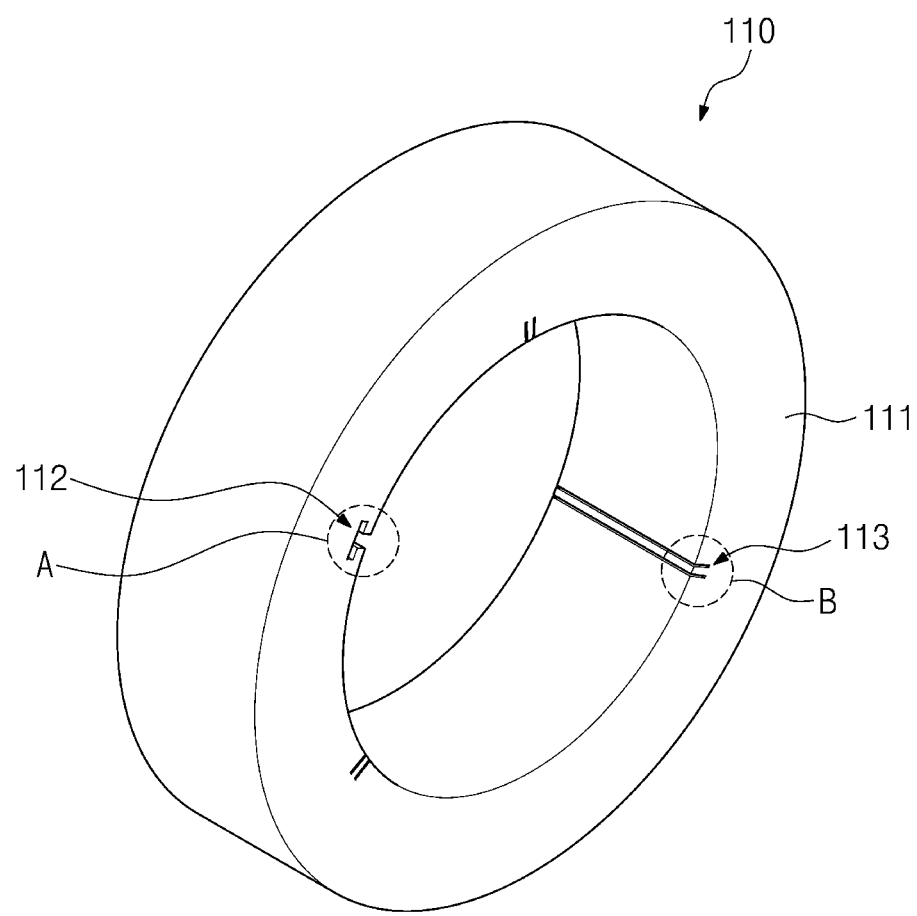

[Fig. 5]
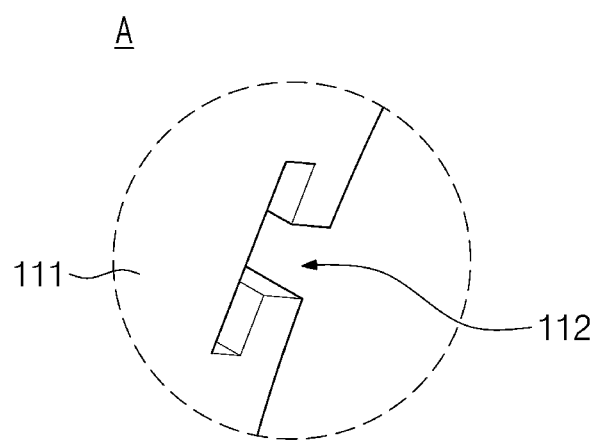

[Fig. 6]
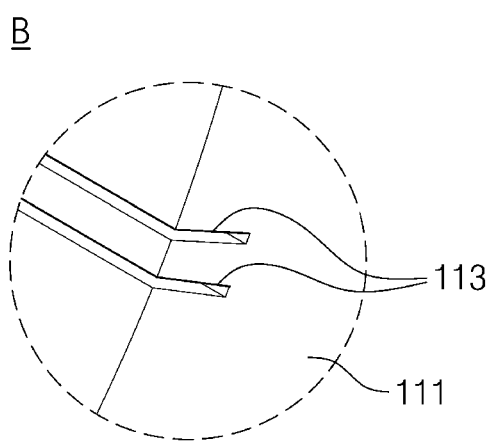

[Fig. 7]
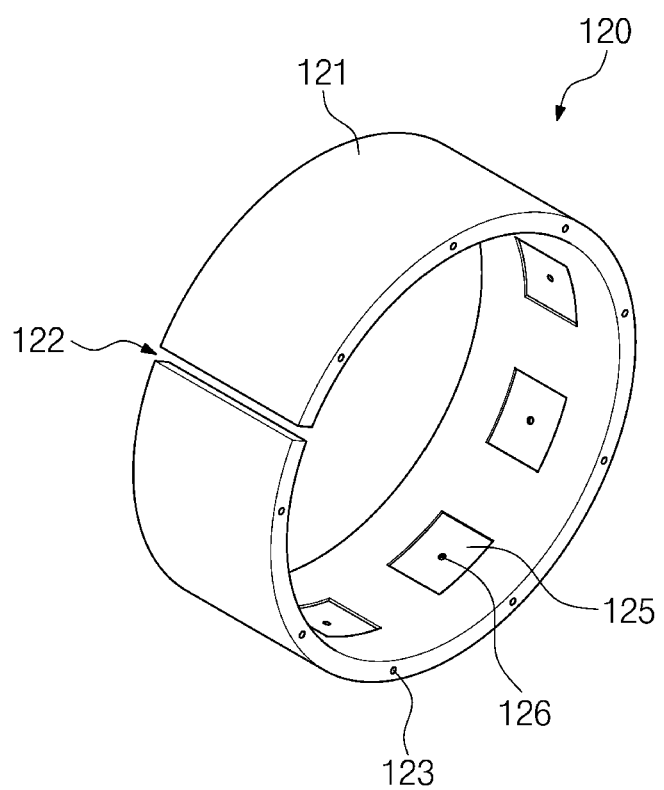

【Fig. 8】
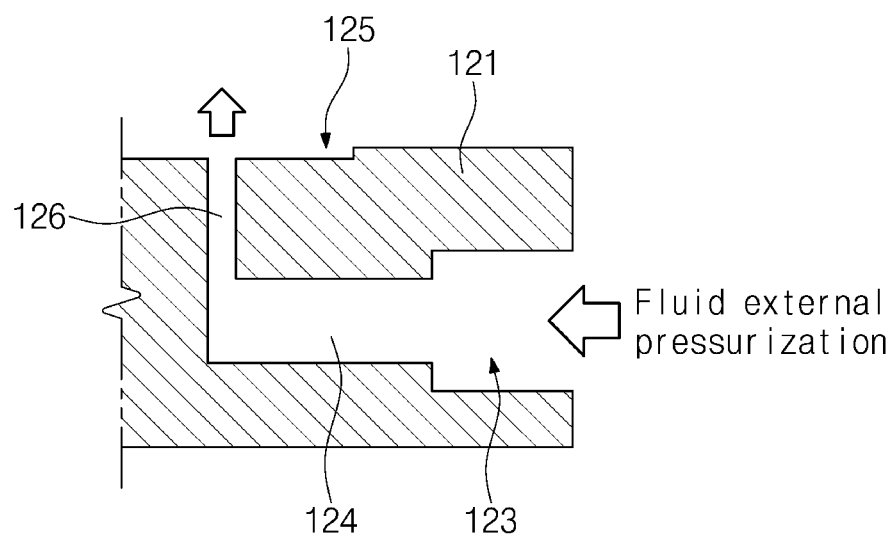

[Fig. 9]
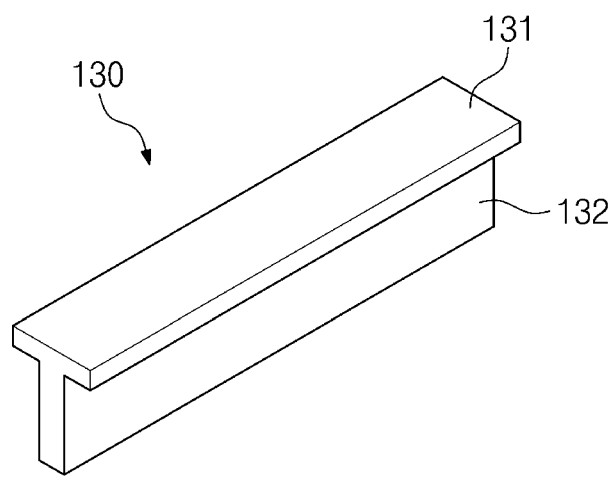

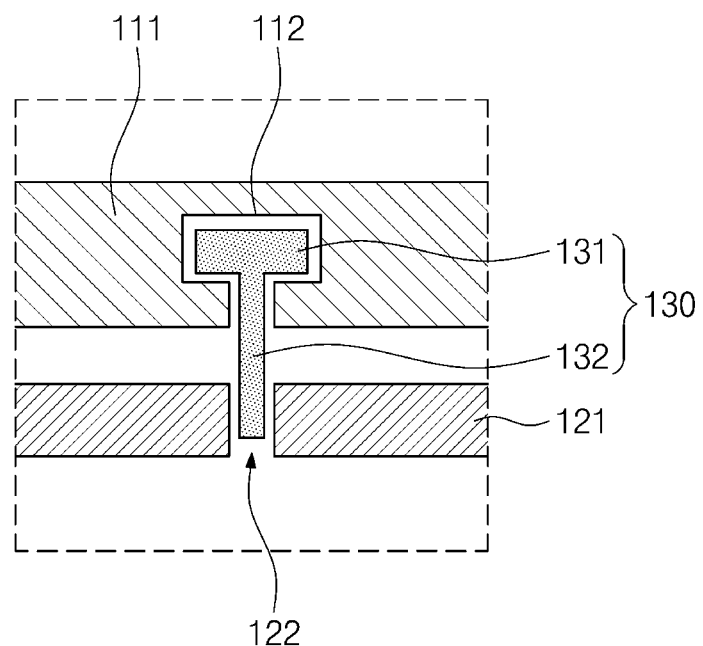
[Fig. 10]

[Fig. 11]
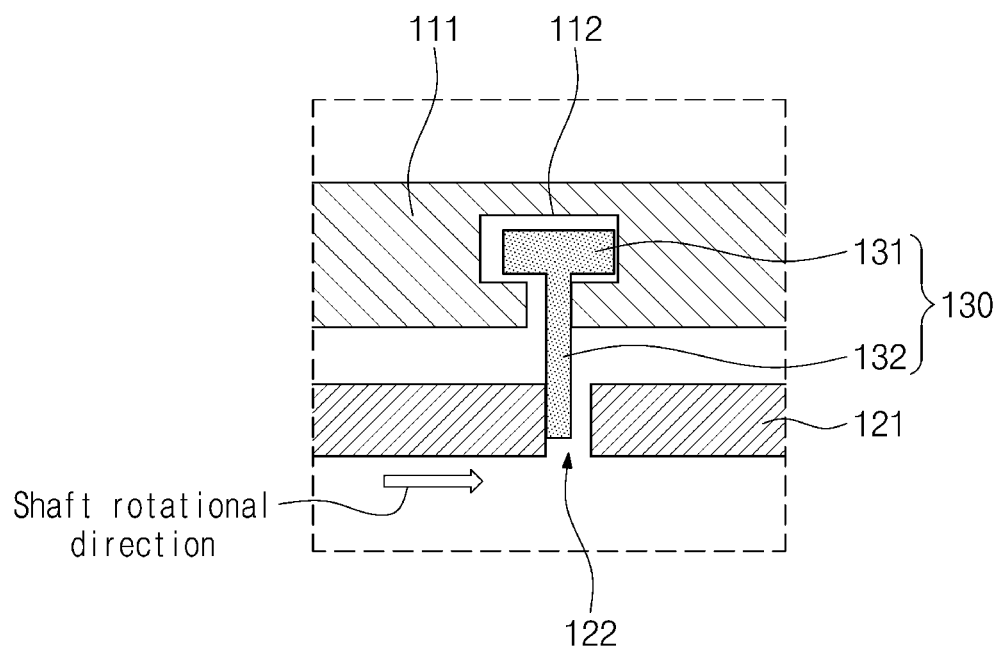

[Fig. 12]
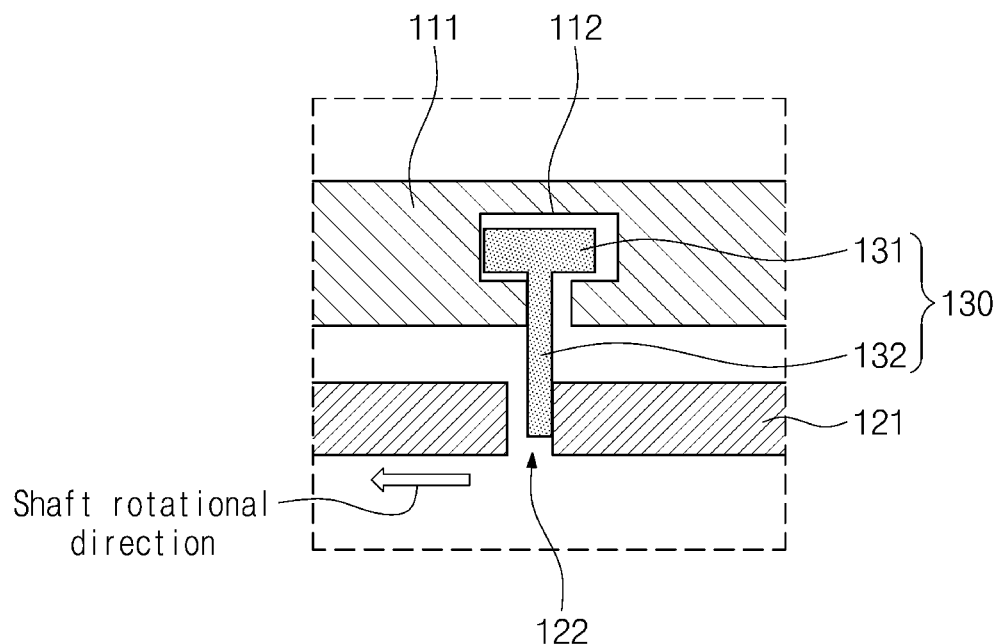

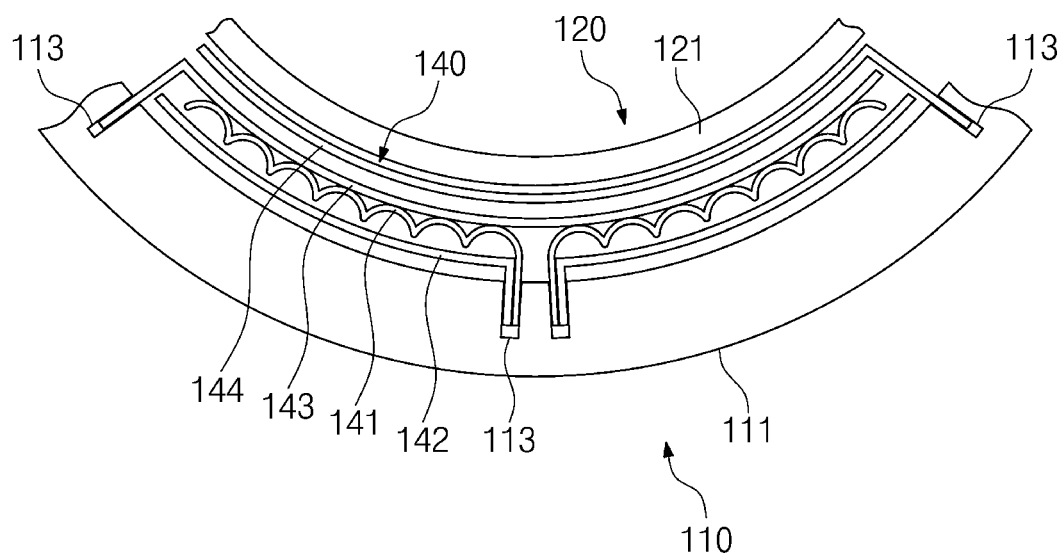
[Fig. 13]

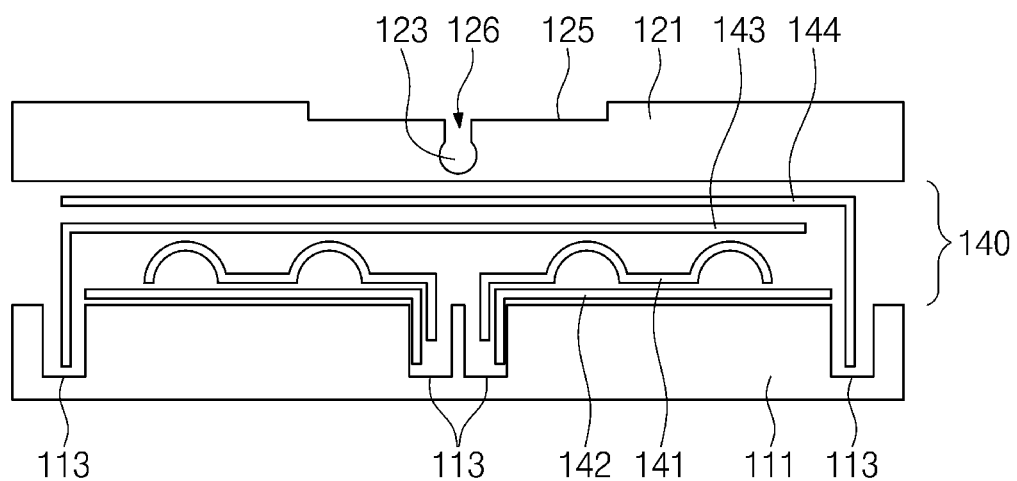
[Fig. 14]

HYBRID FLUID FILM BEARING

TECHNICAL FIELD

The present invention relates to a hybrid fluid film bearing, and more specifically, to a hybrid fluid film bearing for ensuring dynamic stability in a bearing system under extreme operating conditions such as high load, high vibration, high temperature, cryogenic temperature, or misalignment of bearing and shaft.

BACKGROUND ART

Recently, as demands for high-speed rotating machines operable in extreme operating environments are increased in industries related to energy, propulsion, and power, the high-performance and high-efficiency fluid bearing technology has been spotlighted. This is because bearings are very important in developing and operating a high-speed and high-efficiency turbine, compressor, or pump system. In particular, external pressure bearings and foil bearings using working fluids as lubricants are currently receiving great interest in the field of fluid bearing technology, and lots of global companies have continuously invested in the development of products to which the above technology is applied.

The external pressure fluid bearing has advantages in that high-pressure fluid is supplied from the outside to a lubricating surface of the bearing to secure high load-bearing capacity and high rigidity and minimize friction and wear between shafts and bearings even in the absence of relative motion.

However, the external pressure fluid bearing may be easily damaged due to difficulty in securing a gap of the bearing under extreme operating conditions such as high load, high vibration, high temperature, cryogenic temperature, or misalignment of bearing and shaft.

DISCLOSURE

Technical Problem

One technical problem to be solved by the present invention is to provide a hybrid fluid film bearing for ensuring dynamic stability in a bearing system under extreme operating conditions such as high load, high vibration, high temperature, cryogenic temperature, or misalignment of bearing and shaft.

Another technical problem to be solved by the present invention is to provide a hybrid fluid film bearing capable of embodying and tuning the characteristics of the bearing suitable for needs of users.

The technical problems to be solved by the present invention are not limited to the above description.

Technical Solution

In order to solve the above-mentioned technical problems, the present invention provides a hybrid fluid film bearing.

According to one embodiment, the hybrid fluid film bearing includes: a bearing housing mounted in a ring-coupled manner to an outer circumferential surface of a rotary shaft; a sleeve ring mounted between the rotary shaft and the bearing housing so as to have a gap between the rotary shaft and the bearing housing, in which one side of the sleeve ring in a circumferential direction is opened in a radial direction; and a fixing pin connected between the bearing housing and the sleeve ring, and supported by the bearing housing to restrict rotation of the sleeve ring when the rotary shaft is rotated.

According to one embodiment, the bearing housing may include: a housing body having a center opened in an axial direction to allow the rotary shaft to be inserted; and a first slot formed on the inner diameter surface of the housing body so as to be formed in a depth direction from the inner diameter surface of the housing body to accommodate one side of the fixing pin.

According to one embodiment, the sleeve ring may include: a sleeve body having a center opened in the axial direction to allow the rotary shaft to be inserted so as to have an outer diameter smaller than an inner diameter of the housing body; and an opening formed on one side of the sleeve body in the circumferential direction, and formed to communicate between an inside and an outside of the sleeve body in the radial direction, in which one side of the other side of the fixing pin accommodated in the first slot is inserted to the opening.

According to one embodiment, when the one side of the fixing pin is accommodated in the first slot, and the other side of the fixing pin is inserted into the opening, clearances may be formed between the first slot and the one side of the fixing pin and between the opening and the other side of the fixing pin, so that a relative position of the fixing pin may be changed in the first slot and the opening according to a rotation direction of the rotary shaft.

According to one embodiment, when the rotary shaft is rotated, the one side and the other side of the fixing pin may have relative positions, which are changed in directions opposite to each other, in the first slot and the opening.

According to one embodiment, the sleeve ring may further include: a pocket formed in a depth direction on at least one position in the inner diameter surface of the sleeve body; a fitting mount hole provided on one side of the sleeve body in the axial direction, and mounted therein with a fitting for connection with an external fluid supply device; a flow path formed inside the sleeve body to communicate the fitting mount hole with the pocket; and an orifice formed at an end of the flow path positioned on the pocket.

According to one embodiment, the orifice may be formed perpendicular or inclined with respect to the rotary shaft.

According to one embodiment, the bearing further includes a compliant spring damper, wherein the compliant spring damper may be provided in a gap between the bearing housing and the sleeve ring, in which the compliant spring damper may be provided as a bump foil having at least one ply.

According to one embodiment, the compliant spring damper may include a gap control foil provided in a longitudinal direction of the bump foil on both sides of a gap between the bearing housing and the sleeve ring in the width direction.

According to one embodiment, the bearing housing may further include a second slot having at least one formed on an inner diameter surface of the housing body, and formed in a depth direction from the inner diameter surface of the housing body, in which one end of the bump foil or the gap control foil in the longitudinal direction is inserted to the bearing housing.

Advantageous Effects

The bearing according to the embodiment of the present invention may include: a bearing housing mounted in a ring-coupled manner to an outer circumferential surface of a rotary shaft; a sleeve ring mounted between the rotary shaft and the bearing housing so as to have a gap between the rotary shaft and the bearing housing, in which one side of the sleeve ring in a circumferential direction is opened in a radial direction; and a fixing pin connected between the bearing housing and the sleeve ring, and supported by the bearing housing to restrict rotation of the sleeve ring when the rotary shaft is rotated.

Accordingly, the hybrid fluid film bearing may be provided, in which a bearing gap is actively changed under extreme operating conditions such as high load, high vibration, high temperature, cryogenic temperature, or misalignment of bearing and shaft, thereby avoiding the pneumatic hammer instability, so that the stability of the bearing system can be remarkably improved.

In addition, the embodiment of the present invention can provide the hybrid fluid film bearing in which the very excellent damping ability can be facilitated, so that dynamic stability in a bearing system can be ensured under extreme operating conditions such as high load, high vibration, high temperature, cryogenic temperature, or misalignment of bearing and shaft.

In addition, the embodiment of the present invention can provide the hybrid fluid film bearing, in which the rotation can be implemented in both directions while having a simple structure.

In addition, the embodiment of the present invention can provide the hybrid fluid film bearing that can be used as both of a hydrostatic bearing or a hydrodynamic bearing according to the rotational speed and the operating condition.

In addition, the embodiment of the present invention can provide the hybrid fluid film bearing in which processing and assembling can be facilitated and maintenance can be easily performed.

In addition, the embodiment of the present invention can provide the hybrid fluid film bearing in which the coefficient of rigidity and attenuation of the compliant spring damper inserted and fixed between the bearing housing and the sleeve ring may be adjusted, so that the bearing characteristics can be implemented and tuned to be suitable for needs of users.

The above hybrid fluid film bearing according to the embodiment of the present invention can be used as a replacement for bearings in existing turbine/compressor/pump systems.

DESCRIPTION OF DRAWINGS

FIG. 1 is a perspective view showing a hybrid fluid film bearing according to one embodiment of the present invention.

FIG. 2 is a plan view of FIG. 1.

FIG. 3 is a sectional view of FIG. 1.

FIG. 4 is a perspective view showing a bearing housing of the hybrid fluid film bearing according to one embodiment of the present invention.

FIG. 5 is an enlarged view showing part "A" of FIG. 4.

FIG. 6 is an enlarged view showing part "B" of FIG. 4.

FIG. 7 is a perspective view showing a sleeve ring of the hybrid fluid film bearing according to one embodiment of the present invention.

FIG. 8 is a schematic diagram for illustrating a fluid supply path of the hybrid fluid film bearing according to one embodiment of the present invention.

FIG. 9 is a perspective view showing a fixing pin of the hybrid fluid film bearing according to one embodiment of the present invention.

FIG. 10 is a schematic diagram showing a relative position of the fixing pin connecting the bearing housing to the sleeve ring in the hybrid fluid film bearing according to one embodiment of the present invention.

FIGS. 11 and 12 are schematic diagrams showing relative position changes of the fixing pin connecting the bearing housing to the sleeve ring according to a rotational direction of a rotary shaft in the hybrid fluid film bearing according to one embodiment of the present invention.

FIG. 13 is a schematic diagram showing a compliant spring damper of the hybrid fluid film bearing according to one embodiment of the present invention.

FIG. 14 is a reference diagram for illustrating the compliant spring damper of the hybrid fluid film bearing according to one embodiment of the present invention.

BEST MODE

Hereinafter, exemplary embodiments of the present invention will be described in detail with reference to the accompanying drawings. However, the technical idea of the present invention is not limited to the embodiments described herein, but may be realized in different forms. The embodiments introduced herein are provided to sufficiently deliver the idea of the present invention to those skilled in the art so that the disclosed contents may become thorough and complete.

When it is mentioned in the present disclosure that one element is on another element, it means that one element may be directly formed on another element, or a third element may be interposed between one element and another element. Further, in the drawings, thicknesses of films and areas are exaggerated for efficient description of the technical contents.

In addition, in the various embodiments of the present disclosure, the terms such as first, second, and third are used to describe various elements, but the elements are not limited to the terms. The terms are used only to distinguish one element from another element. Therefore, an element mentioned as a first element in one embodiment may be mentioned as a second element in another embodiment. The embodiments described and illustrated herein include their complementary embodiments. Further, the term "and/or" used herein is used to include at least one of the elements enumerated before and after the term.

As used herein, the terms of a singular form may include plural forms unless the context clearly indicates otherwise. Further, the terms such as "including" and "having" are used to designate the presence of features, numbers, steps, elements, or combinations thereof described in the present disclosure, and shall not be construed to preclude any possibility of the presence or addition of one or more other features, numbers, steps, elements, or combinations thereof.

Further, in the following description of the present invention, detailed descriptions of known functions and configurations incorporated herein will be omitted when they may make the subject matter of the present invention unnecessarily unclear.

FIG. 1 is a perspective view showing a hybrid fluid film bearing according to one embodiment of the present invention. FIG. 2 is a plan view of FIG. 1. FIG. 3 is a sectional view of FIG. 1. FIG. 4 is a perspective view showing a bearing housing of the hybrid fluid film bearing according to one embodiment of the present invention. FIG. 5 is an enlarged view showing part "A" of FIG. 4. FIG. 6 is an enlarged view showing part "B" of FIG. 4. FIG. 7 is a perspective view showing a sleeve ring of the hybrid fluid film bearing according to one embodiment of the present invention. FIG. 8 is a schematic diagram for illustrating a fluid supply path of the hybrid fluid film bearing according to one embodiment of the present invention. FIG. 9 is a perspective view showing a fixing pin of the hybrid fluid film bearing according to one embodiment of the present invention. FIG. 10 is a schematic diagram showing a relative position of the fixing pin connecting the bearing housing to the sleeve ring in the hybrid fluid film bearing according to one embodiment of the present invention. FIGS. 11 and 12 are schematic diagrams showing relative position changes of the fixing pin connecting the bearing housing to the sleeve ring according to the rotational direction of the rotary shaft in the hybrid fluid film bearing according to one embodiment of the present invention. FIG. 13 is a schematic diagram showing a compliant spring damper of the hybrid fluid film bearing according to one embodiment of the present invention. FIG. 14 is a reference diagram for illustrating the compliant spring damper of the hybrid fluid film bearing according to one embodiment of the present invention.

As shown in FIGS. 1 to 3, the hybrid fluid film bearing 100 according to one embodiment of the present invention refers to a bearing that can be used as both of a hydrostatic bearing or a hydrodynamic bearing according to the rotational speed and the operating condition.

The hybrid fluid film bearing 100 according to one embodiment of the present invention may include a bearing housing 110, a sleeve ring 120, and a fixing pin 130.

The bearing housing 110 may be mounted in a ring-coupled manner to an outer circumferential surface of a rotary shaft S. The bearing housing 110 may be mounted on an outer diameter surface of the rotary shaft S via the sleeve ring 120. The bearing housing 110 may serve to protect the sleeve ring 120 from external environments.

Referring to FIG. 4, the bearing housing 110 may include a housing body 111 and a first slot 112.

The housing body 111 defines an outer appearance of the bearing housing 110. The housing body 111 may have a center opened in an axial direction in which the rotary shaft S is coupled, so that the rotary shaft S may be inserted therethrough.

The housing body 111 may be provided in a hollow cylindrical or ring shape.

Referring to FIGS. 4 and 5, the first slot 112 may be formed on an inner diameter surface of the housing body 111. The first slot 112 may be formed in a depth direction from the inner diameter surface of the housing body 111.

In one embodiment of the present invention, one side of the fixing pin 130 having a section in a "T" shape may be accommodated in the first slot 112. Accordingly, the first slot 112 may be formed as a groove having a section in a "T" shape so as to accommodate the one side of the fixing pin 130.

In other words, the shape of the first slot 112 according to one embodiment of the present invention may depend on the shape of the fixing pin 130 accommodated therein. For example, when the fixing pin 130 has a section in a circular shape, the first slot 112 may also be formed as a groove having a circular section.

In one embodiment of the present invention, the first slot 112 may be assembled with the one side of the fixing pin 130 very loosely (see FIG. 10). In other words, when the one side of the fixing pin 130 is accommodated in the first slot 112, the inner surface of the first slot 112 and the fixing pin 130 may have a clearance therebetween.

This is configured such that the position of the sleeve ring 120 may be freely determined according to dynamic and static load conditions and alignments, assembly conditions, thermal equilibrium conditions, and the like acting on the hybrid fluid film bearing 100 while the sleeve ring 120 is connected to the bearing housing 110 through the fixing pin 130, and the sleeve ring 120 may be prevented from being restricted to the bearing housing 110 when the sleeve ring 120 is expanded.

The first slot 112 may variable come into contact with the one side of the fixing pin 130 according to the rotational direction of the rotary shaft S, and accordingly, the rotation of the sleeve ring 120 connected to the other side of the fixing pin 130 may be restricted.

Meanwhile, the bearing housing 110 according to one embodiment of the present invention may further include a second slot 113.

The second slot 113 may be formed on an inner diameter surface of the housing body 111. The second slot 113 may be formed in a depth direction from the inner diameter surface of the housing body 111. The second slot 113 may be arranged at a right angle with the inner diameter surface of the housing body 111, or may be inclined at a specific angle based on the inner diameter surface of the housing body 111.

In one embodiment of the present invention, a plurality of second slots 113 may be formed on the inner diameter surface of the housing body 111.

The second slots 113 may be spaced apart from each other in the circumferential direction on the inner diameter surface of the housing body 111. For example, the second slots 113 may be spaced apart from each other in the circumferential direction on the inner diameter surface of the housing body 111 while being in pairs.

The second slot 113 may serve to fix a compliant spring damper (140 in FIG. 13) inserted into the gap between the bearing housing 110 and the sleeve ring 120. The coupling relationship between the second slot 113 and the compliant spring damper (140 in FIG. 13) will be described in more detail below.

Referring back to FIGS. 1 to 3, the sleeve ring 120 may be mounted between the rotary shaft S and the bearing housing 110. The sleeve ring 120 may have a gap between the sleeve ring and the rotary shaft S. In addition, the sleeve ring 120 may have a gap between the sleeve ring and the bearing housing 110.

A fluid may be supplied to the gap between the sleeve ring 120 and the rotary shaft S and the gap between the sleeve ring 120 and the bearing housing 110. The fluid may include any one of oil, air, gas, and cryogenic fluid.

The sleeve ring 120 according to one embodiment of the present invention may have rotation restricted by the fixing pin 130 connected to the bearing housing 110 when the rotary shaft S is rotated.

In addition, the sleeve ring 120 according to one embodiment of the present invention may have a form actively opened when a fluid slick approaches a minimum slick thickness under extreme operating conditions such as high load, high vibration, high temperature, or misalignment of bearing and shaft, so that one side which is not completely closed and is opened in order to prevent breakage.

In other words, the sleeve ring 120 may have a structure capable of freely expanding within an elastic range of a material thereof.

Specifically, the sleeve ring 120 according to one embodiment of the present invention may have one side in the circumferential direction opened in the radial direction.

Accordingly, the hybrid fluid film bearing 100 according to one embodiment of the present invention may have a gap between the rotary shaft S and the sleeve ring 120 actively changed under extreme operating conditions such as high load, high vibration, high temperature, cryogenic temperature, or misalignment of bearing and shaft.

Accordingly, the hybrid fluid film bearing 100 according to one embodiment of the present invention may avoid or delay pneumatic hammer instability, so that the stability of the bearing system can be remarkably improved, and the driving range thereof can be expanded.

Referring to FIG. 7, the sleeve ring 120 according to one embodiment of the present invention may include a sleeve body 121 and an opening 122.

The sleeve body 121 may have a center opened in an axial direction so that the rotary shaft S may be inserted thereto. The sleeve body 121 may be provided in a cylindrical or ring shape.

The sleeve body 121 may have an outer diameter smaller than an inner diameter of the housing body 111. Accordingly, the sleeve body 121 may be assembled to the housing body 111 in the form of being inserted into the inner diameter surface of the housing body 111.

In one embodiment of the present invention, the sleeve body 121 may be provided to have a complete circular shape. However, this is only an example. The sleeve body 121 may be formed in a lobe shape, an offset shape, or an oval shape in order to improve the dynamic stability of the rotating body.

The opening 122 may be provided in the sleeve body 121. The opening 122 may be formed on one side of the sleeve body 121 in the circumferential direction. The opening 122 may be formed to communicate between the inside and the outside of the sleeve body 121 in the radial direction. In other words, the opening 122 may be defined as a portion cut off in the longitudinal direction of the sleeve body 121.

Through the above opening 122, the sleeve ring 120 may have a form in which one side is opened without being completely closed. Accordingly, the sleeve ring 120 may have the gap formed with the rotary shaft S so as to be actively changed under extreme operating conditions such as high load, high vibration, high temperature, cryogenic temperature, or misalignment of bearing and shaft. As a result, the breakage can be prevented in extreme conditions.

Meanwhile, referring to FIGS. 7 and 8, the sleeve ring 120 according to one embodiment of the present invention may further include a fitting mount hole 123, a flow path 124, a pocket 125, and an orifice 126.

The fitting mount hole 123 may be provided in the sleeve body 121. Specifically, the fitting mount hole 123 may be provided on one side in the axial direction of the sleeve body 121. A plurality of fitting mount holes 123 may be provided in the circumferential direction on one side of the sleeve body 121 in the axial direction.

Although not specifically shown, a fitting or a pipe for connection with an external fluid supply device may be mounted to the fitting mount hole 123.

The pocket 125 may be provided on the inner diameter surface of the sleeve body 121. The pocket 125 may be formed in the depth direction from the inner diameter surface of the sleeve body 121. The pocket 125 may be desirable to be provided at a position adjacent to the fitting mount hole 123 for processing convenience.

In one embodiment of the present invention, since a plurality of fittings mount holes 123 are provided, a plurality of pockets 125 may also be provided in the circumferential direction on the inner diameter surface of the sleeve body 121. As a result, a space between the sleeve ring 120 and the rotary shaft S may be smoothly lubricated by the fluid supplied in the circumferential direction of an outer diameter surface of the rotary shaft S.

The pocket 125 may have a rectangular shape in order to improve the load-bearing capacity, rigidity, and damping coefficient of the hybrid fluid film bearing 100.

However, this is only an example. The pocket 125 may have a leaf, hexagon or oval shape.

Meanwhile, other portions of the inner diameter surface of the sleeve body 121 other than the pocket 125 may have a form of a herringbone groove or a spiral groove in order to improve load bearing capacity.

The flow path 124 may be formed inside the sleeve body 121. The flow path 124 may be formed in a shape to communicate the fitting mount hole 123 with the pocket 125, so that the fluid injected from the outside may be supplied to the pocket 125.

In one embodiment of the present invention, the pocket 125 is formed on the inner diameter surface of the sleeve body 121 in a depth direction thereof, and the fitting mount hole 123 is formed on the one side in the axial direction of the sleeve body 121, so that the flow path 124 may be formed in a structure in which one side in the longitudinal direction is bent. When the fitting mount hole 123 and the pocket 125 are positioned adjacent to each other, the convenience of machining the flow path 124 having a bent structure may be improved.

The orifice 126 may be formed at an end of the flow path 124 positioned on the pocket 125 side. Accordingly, the fluid supplied to the sleeve ring 120 through the fitting mounted to the fitting mount hole 123 may be supplied to pocket 125 through the orifice 126 via the flow path 124.

When the fluid is continuously supplied to the pocket 125 through the external fluid supply device, the fitting, the flow path 124 and the orifice 126, the hybrid fluid film bearing 100 according to one embodiment of the present invention may be operated as an external pressure bearing, that is, a hydrostatic bearing.

The external pressure bearing may prevent wear and tear on the bearing surface when driven initially and stopped, thereby increasing lifespan and durability of the bearing, and may be used in operating conditions in which bearing properties, such as high load, high rigidity, and high damping, are required.

However, When the rotary shaft S is stably rotated at high speed, that is, when it is unnecessary to be operated as the external pressure bearing, the hybrid fluid film bearing 100 according to one embodiment of the present invention may also be operated as a hydrodynamic bearing by reducing or stopping the amount of fluid forcibly supplied to the pocket 125.

Meanwhile, in one embodiment of the present invention, the orifice 126 may be formed perpendicular to the rotary shaft S or the pocket 125. However, this is only an example. The orifice 126 may be inclined at a predetermined angle to improve the dynamic stability of a rotating body.

Referring back to FIGS. 1 and 2, the fixing pin 130 may be connected between the bearing housing 110 and the sleeve ring 120. The fixing pin 130 may be supported by the bearing housing 110 when the rotary shaft S is rotated, thereby restricting the rotation of the sleeve ring 120.

Referring to FIG. 9, the fixing pin 130 according to one embodiment of the present invention may include a fixing pin body 131 and a fixing pin branch 132.

The fixing pin body 131 may be provided in the form of a plate-shaped bar extending in one direction. The fixing pin branch 132 may be provided on one side of the fixing pin body 131.

The fixing pin branch 132 may extend from the one side of the fixing pin body 131 in a normal direction thereof. The fixing pin branch 132 may have the same length as the fixing pin body 131. Accordingly, the end of the fixing pin 130 may have a "T" shape.

Accordingly, the first slot 112 of the bearing housing 110 in which the fixing pin 130 is accommodated may also have a "T"-shaped section. However, this is only an example. The fixing pin 130 may be provided in various shapes. In the present invention, the fixing pin 130 is not limited to a specific shape such as the "T"-shaped section.

Referring to FIG. 10, when the bearing housing 110 is assembled with the sleeve ring 120 through the fixing pin 130, the fixing pin body 131 corresponding to the one side of the fixing pin 130 may be accommodated in the first slot 112 provided in the bearing housing 110.

At the same time, the fixing pin branch 132 corresponding to the other side of the fixing pin 130 may be inserted into the opening 122 provided in the sleeve ring 120.

The outer surface of the fixing pin body 131 and the inner surface of the first slot 112 may have an interval therebetween. In addition, the outer surface of the fixing pin branch 132 and the wall surface of the opening 122 may have an interval therebetween.

Accordingly, the fixing pin 130 may have a relative position changed within the first slot 112 and the opening 122 according to the rotation direction of the rotary shaft S.

Referring to FIG. 11, when the rotary shaft S is rotated in the right (clockwise) direction, the sleeve body 121 of the sleeve ring 120 may also be rotated in the same direction.

In the above process, the fixing pin 130 inserted into the opening 122 with a gap therebetween, more particularly, one side of the fixing pin branch 132 moves in the right direction while coming into contact with the left wall of the opening 122, and then the other side of the fixing pin branch 132 comes into contact with the right inner wall surface of the first slot 112. The other side of the fixing pin branch 132 refers to a portion adjacent to the fixing pin body 131.

In other words, the fixing pin 130 moves from the initial position to the right by the sleeve body 121 and a further movement is blocked by the housing body 111.

When the movement of the fixing pin 130 is blocked by the housing body 111, the sleeve ring 120 may be maintained in a fixed state without being rotated by the fixing pin 130 that is blocked from moving by the housing body 1111, even when the rotary shaft S is rotated.

Likewise, referring to FIG. 12, when the rotary shaft S is rotated in the left (counterclockwise) direction, the sleeve body 121 of the sleeve ring 120 may also be rotated in the same direction.

In the above process, the fixing pin 130 inserted into the opening 122 with a gap therebetween, more particularly, to one side of the fixing pin branch 132 moves in the left direction while coming into contact with the right wall of the opening 122, and then the other side of the fixing pin branch 132 comes into contact with the left inner wall surface of the first slot 112.

In other words, the fixing pin 130 moves from the initial position to the left by the sleeve body 121 and a further movement is blocked by the housing body 111. When the movement of the fixing pin 130 is blocked by the housing body 111, the sleeve ring 120 may be maintained in a fixed state without being rotated by the fixing pin 130 that is blocked from moving by the housing body 1111, even when the rotary shaft S is rotated.

Accordingly, the fixing pin body 131 and the fixing pin branch 132 constituting the fixing pin 130 have relative positions changed in the first slot 112 and the opening 122 in opposite directions to each other, so that the rotation of the sleeve ring 120 is restricted.

In other words, even when the rotary shaft S is rotated clockwise or counterclockwise, the sleeve ring 120 according to one embodiment of the present invention may be maintained in a fixed state without interlocking with the clockwise or counterclockwise rotation, through the fixing pin 130 having the movement restricted within the clearance distance by the bearing housing 110.

Meanwhile, referring to FIGS. 13 and 14, the hybrid fluid film bearing 100 according to one embodiment of the present invention may further include a compliant spring damper 140.

The compliant spring damper 140 has spring characteristics and friction damping characteristics at the same time. The compliant spring damper 140 may maintains the characteristics of the damper even under high-temperature conditions subject to the high-speed rotation of the rotary shaft S, so that a constant damping ability may be continuously maintained.

The compliant spring damper 140 may be provided in a gap between the bearing housing 110 and the sleeve ring 120. The compliant spring damper 140 according to one embodiment of the present invention may be provided as a bump foil 141.

The bump foil 141 may be formed of one ply or one layer. However, this is only an example. The bump foil 141 may also be provided as a double bump foil 141 formed of two plies or a multi-bump foil 141 formed of multiple plies, according to the damping characteristics, durability requirements, and the like required for the hybrid fluid film bearing 100.

The bump foil 141 may be provided in a gap between the bearing housing 110 and the sleeve ring 120, so as to be symmetrical right and left in the circumferential direction. Accordingly, the same rigidity and damping may be given even when the rotary shaft S is rotated in any direction.

A plurality of bump foils 141 may be provided in a circumferential direction in a gap between the bearing housing 110 and the sleeve ring 120. One end of the bump foil 141 in the longitudinal direction may be inserted and fixed in the second slot 113 provided in the bearing housing 110.

Meanwhile, the compliant spring damper 140 according to one embodiment of the present invention may include a plurality of gap control foils 142, 143 and 144 for gap adjustment and preload application.

The gap control foils 142, 143 and 144 may be provided in the longitudinal direction in the form of wrapping the bump foil 141 on both sides in the width direction of the gap between the bearing housing 110 and the sleeve ring 120.

Specifically, the first gap control foil 142 may be provided in the longitudinal direction of the bump foil 141 between the bump foil 141 and the bearing housing 110. In addition, the second gap control foil 143 may be provided in the longitudinal direction of the bump foil 141 between the bump foil 141 and the sleeve ring 120.

A third gap control foil 144 may be provided to be fixed in a direction opposite to the second gap control foil 143, between the bump foil 141 and the sleeve ring 120.

Thus, when the hybrid fluid film bearing 100 is operated, the second gap control foil 143 and the third gap control foil 144 move in opposite directions to each other, thereby generating a large frictional motion so as to increase the damping force.

In one embodiment of the present invention, each or one or more of the first gap control foil 142, the second gap control foil 143 and the third gap control foil 144 may also be inserted into and fixed to a plurality of second slots 113 each having one end in the longitudinal direction thereof provided in the bearing housing 110.

The hybrid fluid film bearing 100 according to one embodiment of the present invention may improve the dynamic stability of the bearing system by adding a hysteresis damping via the compliant spring damper 140.

According to the hybrid fluid film bearing 100 of one embodiment of the present invention, the rigidity and damping of the compliant spring damper 140 may be controlled, so that the bearing characteristics suitable for the needs of users can be realized, and tuning of the characteristics can also be facilitated.

Meanwhile, although the shape of the bump foil 141 is exemplified as the compliant spring damper 140 in one embodiment of the present invention, this is only an example, and a viscoelastic damper, an elastomer damper, a wave spring, a Marcel expander, a wire mesh damper, a coil spring, a tolerance ring, a cantilever beam foil, a wing foil and the like may be applied as the compliant spring damper 140.

Although the exemplary embodiments of the present invention have been described in detail, the scope of the present invention is not limited to a specific embodiment, and should be interpreted by the appended claims. In addition, it should be understood by those of ordinary skill in the art that various changes and modifications can be made without departing from the scope of the present invention.

The invention claimed is:

1. A hybrid fluid film bearing comprising:
a bearing housing mounted in a ring-coupled manner to an outer circumferential surface of a rotary shaft;
a sleeve ring mounted between the rotary shaft and the bearing housing so as to have a gap between the rotary shaft and the bearing housing; and
a fixing pin connected between the bearing housing and the sleeve ring, and supported by the bearing housing to restrict rotation of the sleeve ring when the rotary shaft is rotated,
wherein the bearing housing includes:
a housing body having a center opened in an axial direction to allow the rotary shaft to be inserted; and
a first slot formed on an inner diameter surface of the housing body, and formed in a depth direction from the inner diameter surface of the housing body to accommodate one side of the fixing pin,
wherein the sleeve ring includes:
a sleeve body having a center opened in the axial direction to allow the rotary shaft to be inserted, and having an outer diameter smaller than an inner diameter of the housing body; and
an opening formed on one side of the sleeve body in a circumferential direction, formed to communicate between an inside and an outside of the sleeve body in a radial direction, and having one side to which an opposite side of the fixing pin accommodated in the first slot is inserted, and
wherein, when the one side of the fixing pin is accommodated in the first slot, and the opposite side of the fixing pin is inserted into the opening, clearances are formed between the first slot and the one side of the fixing pin and between the opening and the opposite side of the fixing pin, so that a relative position of the fixing pin is changed in the first slot and the opening according to a rotation direction of the rotary shaft.

2. The hybrid fluid film bearing of claim 1, wherein, when the rotary shaft is rotated, the one side and the opposite side of the fixing pin have relative positions, which are changed in directions opposite to each other, in the first slot and the opening.

3. The hybrid fluid film bearing of claim 1, further comprising:
a compliant spring damper, wherein
the compliant spring damper is provided in a gap between the bearing housing and the sleeve ring, and provided as a bump foil having at least one ply.

4. The hybrid fluid film bearing of claim 3, wherein the compliant spring damper includes a gap control foil provided in a longitudinal direction of the bump foil on both sides of a gap between the bearing housing and the sleeve ring in a width direction.

5. A hybrid fluid film bearing comprising:
a bearing housing mounted in a ring-coupled manner to an outer circumferential surface of a rotary shaft;
a sleeve ring mounted between the rotary shaft and the bearing housing so as to have a gap between the rotary shaft and the bearing housing; and
a fixing pin connected between the bearing housing and the sleeve ring, and supported by the bearing housing to restrict rotation of the sleeve ring when the rotary shaft is rotated,
wherein the bearing housing includes:
a housing body having a center opened in an axial direction to allow the rotary shaft to be inserted; and
a first slot formed on an inner diameter surface of the housing body, and formed in a depth direction from the inner diameter surface of the housing body to accommodate one side of the fixing pin,
wherein the sleeve ring includes:
a sleeve body having a center opened in the axial direction to allow the rotary shaft to be inserted, and having an outer diameter smaller than an inner diameter of the housing body; and
an opening formed on one side of the sleeve body in a circumferential direction, formed to communicate between an inside and an outside of the sleeve body in a radial direction, and having one side to which an opposite side of the fixing pin accommodated in the first slot is inserted, and
wherein the sleeve ring further includes:
a pocket formed in the depth direction on at least one position in the inner diameter surface of the sleeve body;
a fitting mount hole provided on one side of the sleeve body in the axial direction, and mounted therein with a pipe for connection with an external fluid supply device;
a flow path formed inside the sleeve body to communicate the fitting mount hole with the pocket; and
an orifice formed at an end of the flow path positioned on the pocket.

6. The hybrid fluid film bearing of claim 5, wherein the orifice is formed perpendicular or inclined with respect to the rotary shaft.

7. A hybrid fluid film bearing comprising:
a bearing housing mounted in a ring-coupled manner to an outer circumferential surface of a rotary shaft;
a sleeve ring mounted between the rotary shaft and the bearing housing so as to have a gap between the rotary shaft and the bearing housing;
a fixing pin connected between the bearing housing and the sleeve ring, and supported by the bearing housing to restrict rotation of the sleeve ring when the rotary shaft is rotated; and
a compliant spring damper,
wherein the compliant spring damper is provided in a gap between the bearing housing and the sleeve ring, and provided as a bump foil having at least one ply,
wherein the compliant spring damper includes a gap control foil provided in a longitudinal direction of the bump foil on both sides of a gap between the bearing housing and the sleeve ring in a width direction, and
wherein the bearing housing further includes at least one second slot formed on an inner diameter surface of a housing body, and formed in a depth direction from the inner diameter surface of the housing body, in which one end of the bump foil or the gap control foil in the longitudinal direction is inserted to the at least one second slot.

* * * * *